United States Patent [19]

Weaver

[11] 4,057,151
[45] Nov. 8, 1977

[54] SILO UNLOADER AND APPARATUS THEREFOR

[76] Inventor: Richard L. Weaver, Rte. 1, Myerstown, Pa. 17067

[21] Appl. No.: 218,736

[22] Filed: Jan. 18, 1972

[51] Int. Cl.² .................. A01F 25/20; B65G 65/46
[52] U.S. Cl. .................. 214/17 DA; 74/128
[58] Field of Search .................. 74/128, 129; 198/213; 212/67, 69; 214/17 D, 17 DA

[56] References Cited

U.S. PATENT DOCUMENTS

| | | | |
|---|---|---|---|
| 1,729,211 | 9/1929 | Erisman | 198/213 |
| 2,715,944 | 8/1955 | Dohrer | 74/128 X |
| 2,755,942 | 7/1956 | Broberg | 214/17 DA |
| 3,237,788 | 3/1966 | Weaver et al. | 214/17 DA |
| 3,289,862 | 12/1966 | Weaver et al. | 214/17 DA |
| 3,356,235 | 12/1967 | Laidig | 214/17 DA |
| 3,391,809 | 7/1968 | Weaver et al. | 214/17 DA |
| 3,394,825 | 7/1968 | Reed | 214/17 DA |
| 3,451,567 | 6/1969 | Laidig | 214/17 DA |
| 3,501,029 | 3/1970 | Weaver et al. | 214/17 DA |
| 3,513,994 | 5/1970 | De Bower et al. | 214/17 DA |
| 3,535,945 | 10/1970 | Bowman | 74/129 |

Primary Examiner—Evon C. Blunk
Assistant Examiner—Jeffrey V. Nase
Attorney, Agent, or Firm—Paul & Paul

[57] ABSTRACT

A silo unloader is provided, of the bottom unloader type, wherein an auger type conveyor is utilized for cutting silage and delivering it generally radially inwardly, with one or more auxiliary augers being provided. The auger is supported at its radial outermost end and is intermittently driven in a sweeping motion. Particularly novel driving apparatus is provided, for causing such a sweeping motion of the auger, as well as systems for lubricating various components of the apparatus.

21 Claims, 15 Drawing Figures

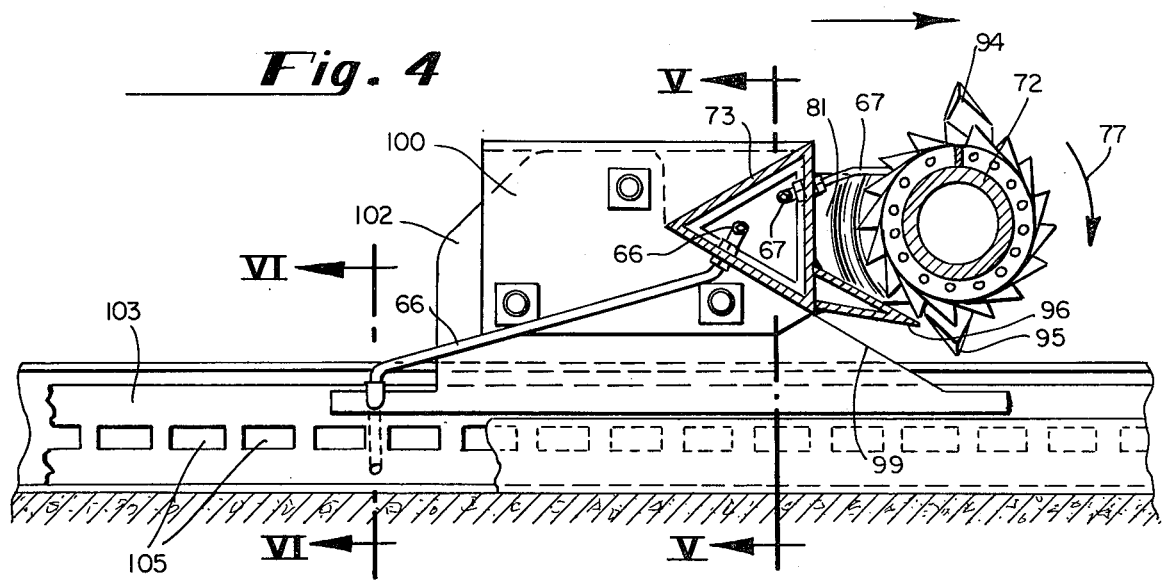
Fig. 4
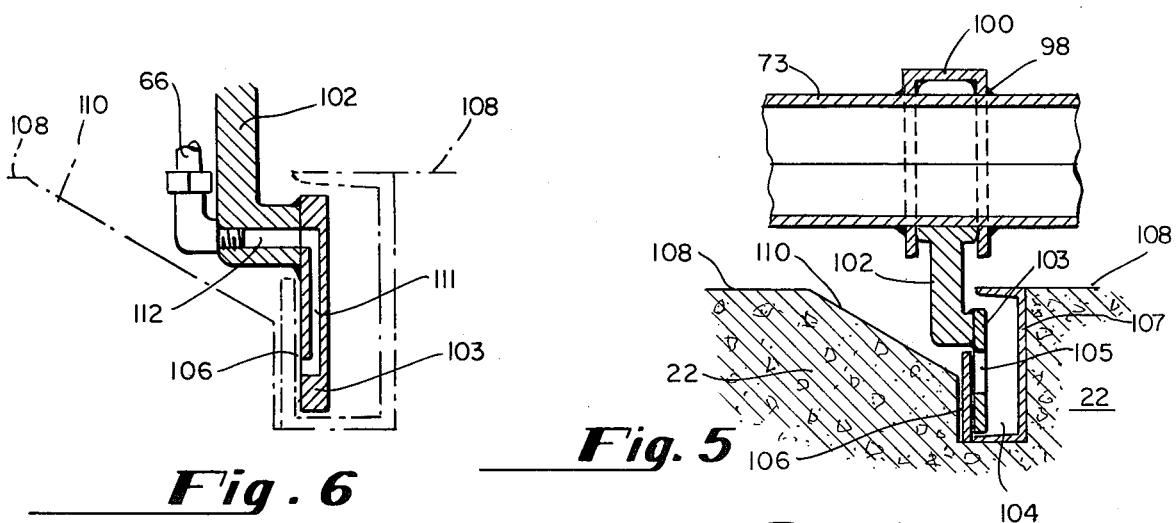
Fig. 6
Fig. 5
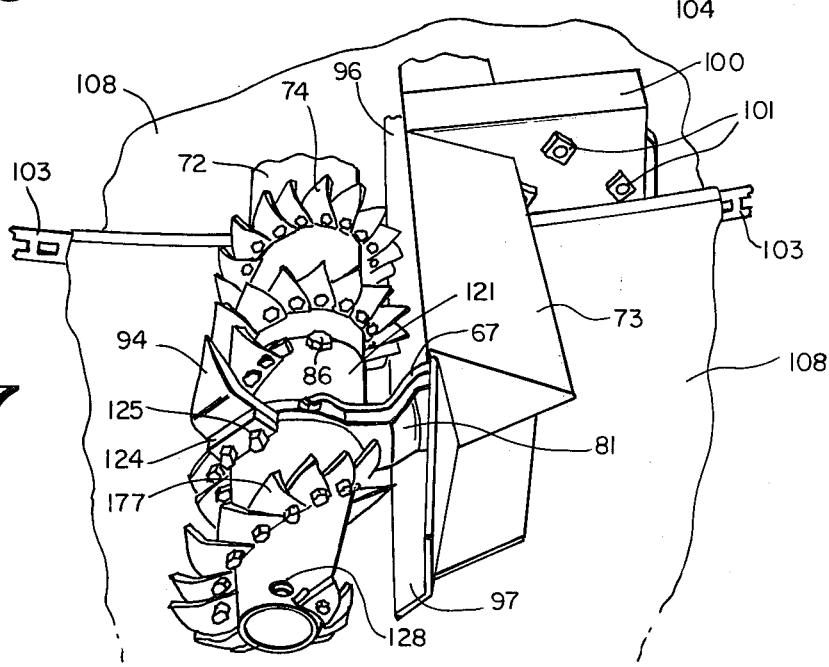
Fig. 7

REVERSE DRIVE

REVERSE RETURN STROKE

{ 4,057,151 }

SILO UNLOADER AND APPARATUS THEREFOR

BACKGROUND OF THE INVENTION

Storage silos for the storage of grain, feed and the like can be either of the top unloader type, or bottom unloader type. It is often preferred to utilize silos of the bottom unloader type, in that, by withdrawing silage from the bottom of the silo, the oldest silage is utilized first, as well as for many other reasons. The present invention is directed toward bottom unloaders for silos.

Bottom unloaders have also been developed in the past, but difficulties with such unloaders have very often been experienced, in that the tremendous weight of silage upon the bottom unloaders often compact silage about the unloader, acting as a brake, and jamming the operation of the unloader.

Particularly, when the unloader is of the auger type, with teeth or other suitable cutting devices for cutting silage as an auger is rotated about its axis, and for propelling, or otherwise conveying silage thus cut, to a generally central location, it is also necessary to move such an auger across the floor of a silo.

If such an auger is of a radial type, adapted for a sweeping motion about a center, for example, of a generally cylindrical silo, such may sweep across the floor of the silo, cutting a path, with silage from an upper part of the silo then falling downwardly into the zone just previously traversed by the auger.

It has been found that such augers must be constructed in such a manner as to withstand tremendous silage forces.

Also, there is present the problem of how to drive the auger in its sweeping motion. Some systems have been developed, whereby a motor or the like may be mounted at a radial outermost end of an auger for driving a member which in turn, is engageable with another member at the periphery of the silo floor, or inside the silo wall. However, if a motor or the like is adapted for movement with the auger about the silo, in its sweeping action, should the auger become jammed, it may be exceedingly difficult, if not impossible to service the motor.

THE PRESENT INVENTION

Accordingly, the present invention is addressed to the provision of a sturdy, powerful drive for an auger, in its sweeping motion across a silo floor, and to lubrication systems therefor, and to auxiliary auger mounting adaptations, separately and associated therewith.

Accordingly, it is a primary object of this invention to provide a novel auger construction.

It is a further object of this invention to provide novel auxiliary auger constructions, for use with a primary auger.

It is a further object of this invention to accomplish each of the objects set forth immediately above, wherein the auger is adapted for use as a bottom unloader for a silo.

It is a further object of this invention to provide a novel drive for causing a sweeping motion of an auger, about a pivot generally at one end thereof.

It is another object of this invention to accomplish the above object, wherein such drive for the auger is intermittent.

It is a further object of this invention to accomplish the two objects set forth immediately above, wherein a drive band is utilized.

It is another object of this invention to accomplish the object set forth above, wherein the drive for the band is disposed inside the silo.

Another object of this invention resides in lubrication devices and systems for the various moving components necessary to provide a workable silo bottom unloader.

A further object of this invention is to provide a novel fluid drive system and components thereof, separately, and for use with an auger drive.

Another object of this invention resides in the provision of a novel two-way valve device.

Other objects and advantages of the present invention will become readily apparent to those skilled in the art from a reading of the following brief descriptions of the drawing figures, detailed description of the preferred embodiment, and the appended claims.

IN THE DRAWINGS

FIG. 4 is a transverse sectional view, through the unloader of FIG . 1, taken generally along the line IV—IV of FIG. 1.

FIG. 5 is a fragmentary sectional view, taken through the band and track of this invention, generally along the line V—V of FIG. 4.

FIG. 6 is a sectional view, also taken through the band and with the track being illustrated in phantom, and with lubrication delivery means for the track also being illustrated, such section being taken along the line VI—VI of FIG. 4.

FIG. 7 is a fragmentary end perspective view of a portion of the unloader apparatus of this invention, particularly illustrating the auxiliary auger and cutting means of both the auxiliary auger and primary auger.

DESCRIPTION OF THE PREFERRED EMBODIMENTS

Figure 1:
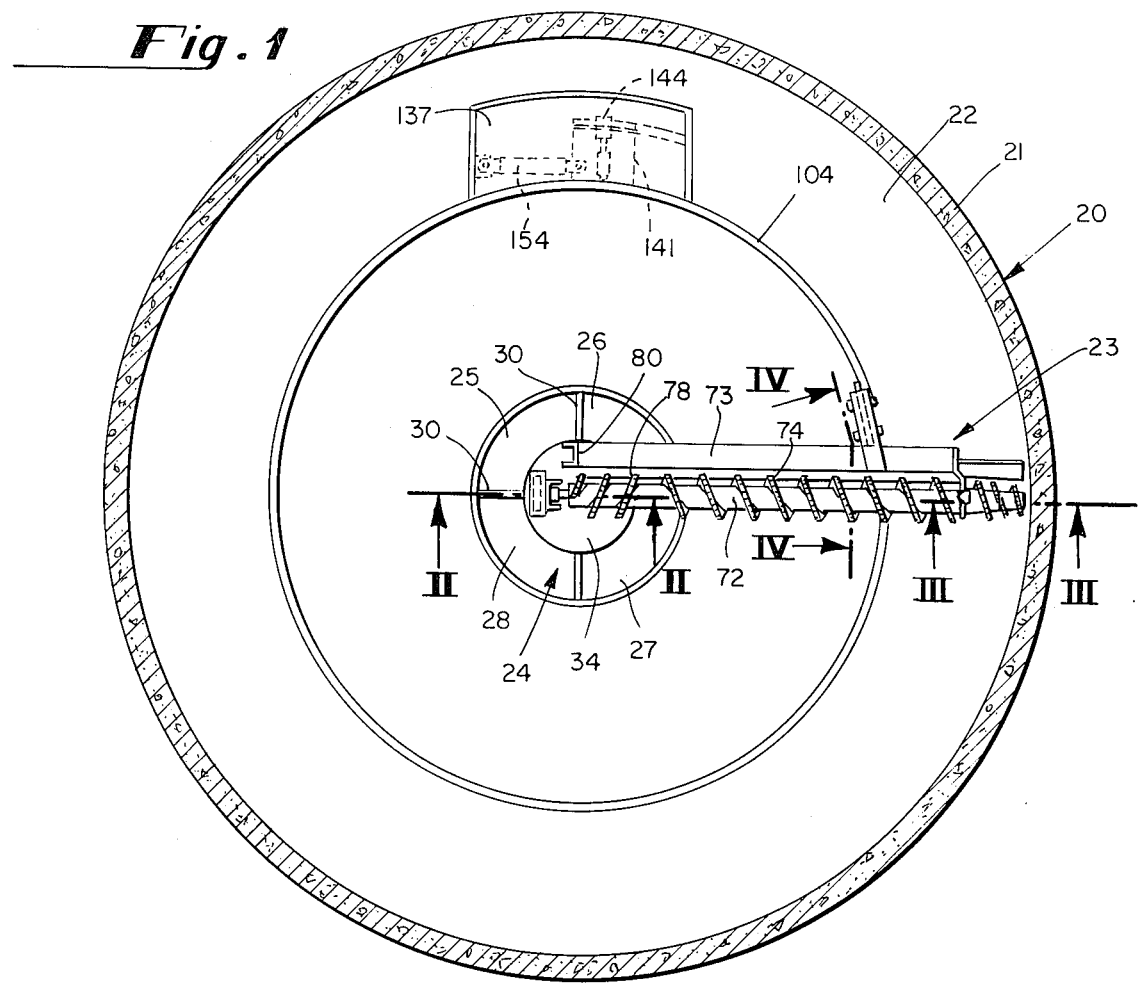
FIG. 1 is a top plan view of a silo unloader and apparatus, in accordance with this invention, with the illustration being taken through a silo, and with the silo being shown in section.

Referring now to the drawings in detail, reference is first made to FIG. 1, wherein a silo 20 is illustrated, that may be of concrete or the like construction, having a cylindrical wall 21, and a silo bottom or floor 22. The unloader apparatus is generally designated by the numeral 23.

A central outlet zone 24 is disposed, generally at the geometric center of the silo 20, for receiving silage through quadrant openings 25, 26, 27 and 28 thereof with such quadrants being divided by spacer supports 30 extending radially inwardly from an outer peripheral ring 31 carried by the concrete floor 32, to an inner ring 33.

Figure 2:
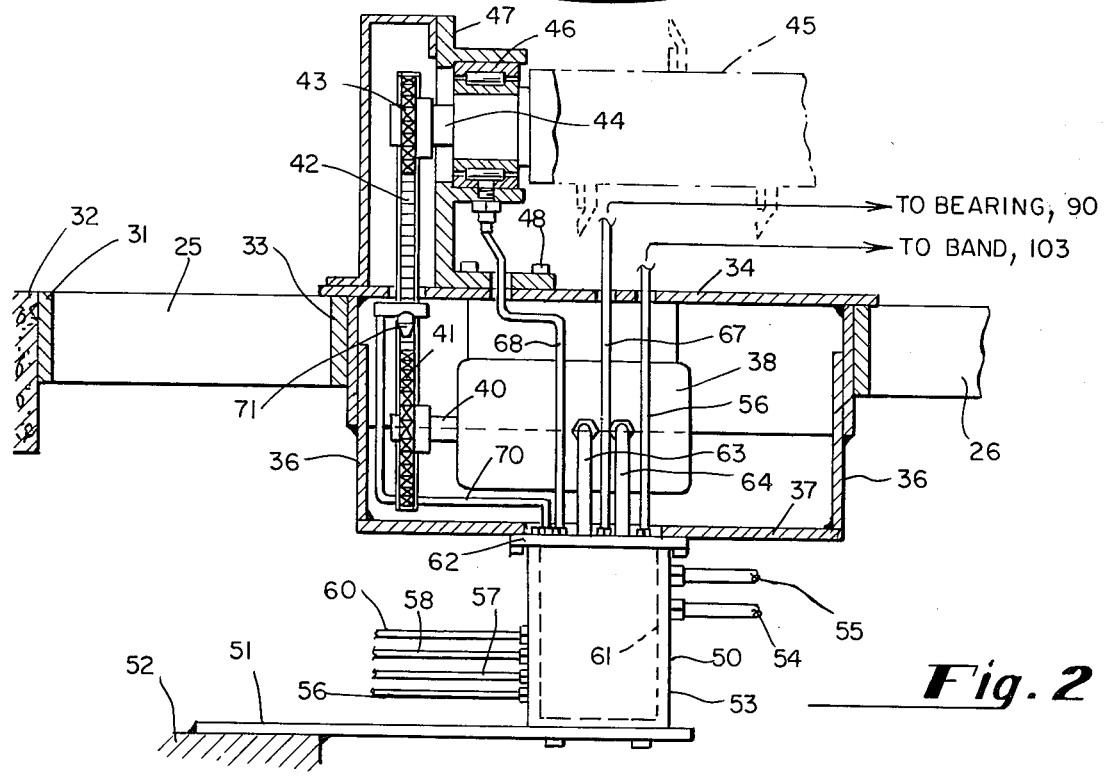
FIG. 2 is a sectional view, through a portion of the auger pivoting apparatus illustrated in FIG. 1, with an auger also being fragmentally illustrated in phantom, the illustration being taken generally along the line II—II of FIG. 1.

A central supporting plate 34 having a cylindrical sleeve 35 extending downwardly therefrom, and welded thereto, is provided, for rotary motion within the ring 33. A pair of bars 36 are welded to the sleeve 35, and extend downward therefrom, and are provided with a cross bar 37 connecting across the bottom thereof, as illustrated in FIG. 2.

A fluid drive motor 38 is provided, disposed beneath the center support plate 34, and suitably mounted for rotational movement therewith, with the motor 38 having an output shaft 40 with a sprocket, or suitable drive member 41, to which is connected a drive chain 42, that in turn is connected in driving engagement with a driven sprocket 43, connected to a shaft 44 of an auger 45. The shaft 44 is suitably mounted on a bearing 46 housed within a frame member 47, with the frame member 47 being carried by the plate 34, and connected thereto by suitable fasteners 48 or the like.

Figure 3:
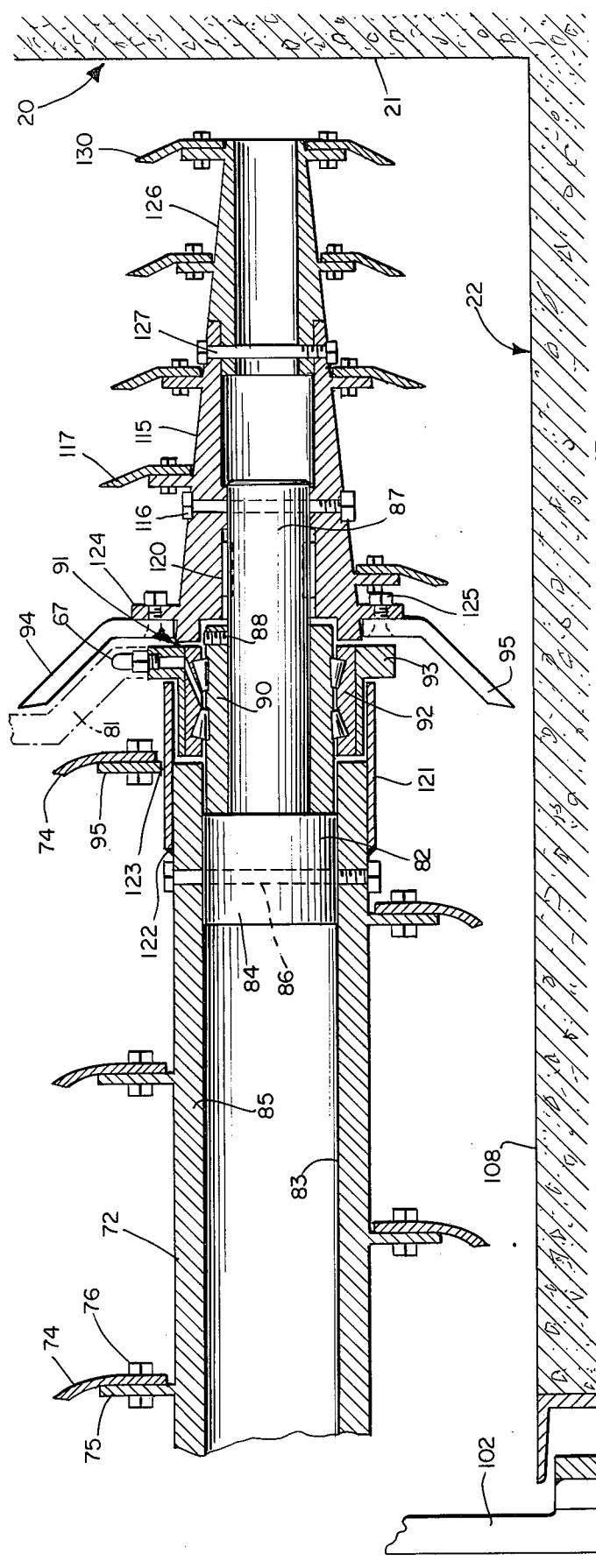
FIG. 3 is an enlarged longitudinal sectional view, taken through the right end of the auger of FIG. 1, and the auxiliary auger connected thereto, generally along the line III—III of FIG. 1.

A suitable supply 50, for lubricating grease, and for fluid for driving the fluid drive motor 38, is provided, with a device 50 being carried by a support 51, which in turn, is suitably carried by a concrete, metal or other suitable non-moving base member 52. The member 50 comprises a fixed outer container 53, to which is delivered fluid supply and return lines 54 and 55 respectively, for the fluid drive motor 38, and also to which is delivered suitable lubricant lines, such as grease lines 56, 57, 58 and 60. An internal canister-type member 61 illustrated in broken lines in FIG. 3, is adapted for rotation with a top plate 62, that in turn, is bolted or suitably connected to the cross bar 37, and adapted for movement therewith, and with drive fluid lines 63 and 64 connected for movement with the plate 62, and with the lines 63 and 64 being respectively connected in communication with lines 54 and 55. Similarly, lubricant delivery lines 66, 67, 68 and 70 are adapted for delivering lubricant from the respectively associated lines 56, 57, 58 and 60, but with the latter-mentioned group of lines being stationary, and with the lines 66, 67, 68 and 70 rotating with the plate 62. The means which accomplishes such rotation is not specifically a part of the invention of this application.

The lubricant delivery line 70 is adapted to deliver lubricating grease or the like through an outlet 71, for lubricating the sprockets 41 and 43, and the connecting chain 42. It will be apparent that other suitable drive means other than the chain-and-sprocket arrangement may be utilized, for rotating the shaft 44, by a motor 38 or the like.

The unloader 23 includes an auger 72 and a support arm 73 therefor. The auger 72 is provided with a plurality of leftwardly bent cutting teeth 74, as viewed in FIG. 3, mounted to a helically disposed flange 75, carried by the auger 72, by suitable bolts 76 or the like, with the teeth 74 thus being arranged in helically-wound fashion, as illustrated in FIG. 1, such that that portion of the auger 72 from the generally centrally disposed openings 26, 27, 28 and 30 outwardly of the primary auger 72, is adapted to facilitate, upon driving the auger 72 in the clockwise direction illustrated by the arrow 77 in FIG. 4, moving silage leftwardly, as viewed in FIG. 1, for disposition through the openings 26, 27, 28 and 30.

It will be noted that the openings 26, 27, 28 and 30 are not precisely centrally located, but, only "generally" centrally located, with respect to the bottom 22 of the silo 20, in order to accommodate the pivotal center support 34, for the auger 72 and its support arm 73. Cutting means or cutting teeth 78 are disposed in an oppositely wound helix to that of the disposition of the teeth 74, for oppositely directed conveyance of silage.

Thus, silage disposed above the rotating support plate 34 will be conveyed from the precise geometric center of the plate 34, radially outwardly to the openings 26, 27, 28 and 30, which, are described herein as being "generally centrally located" with respect to the silo.

The silo support arm 73 is welded, bolted, or otherwise suitably connected to a channel member 80, that in turn, is carried by the rotatable center support 34. The right-most end of the auger 72 is carried, by a suitable supporting bracket 81, that in turn is carried by the support arm 73, for driving of the radial outer most end of the auger 72, through the support arm 73, by means later to be described hereinafter.

A spindle 82, disposed within a bore 83 of the auger 72 as illustrated in FIG. 3, is provided, with a left-most portion 84, as illustrated in FIG. 3, being connected to the cylindrical portion 85 of the auger 72, by means of a thru-bolt 86, and with a right-most, or reduced diameter extension portion 87 receiving, generally in press-fit relation thereover, or suitably locked thereto by a set screw 88, the inner race 90 of a supporting bearing generally designated 91. The bearing 91 is of the anti-friction type, and has an outer race 92 carried by the support bracket 93. The bearing 91 is lubricated, by the lubrication delivery line 67 illustrated in FIG. 2, just as the bearing 46 in FIG. 2 is lubricated from the line 68. In order to deliver the grease or other lubricant through the line 67 to the bearing 91, the line 67 is run through the support arm 73, as illustrated in FIG. 4, to the bearing 91, following the generally S-shaped, or tortuous path of the upper surface of the support bracket 81, as illustrated in the perspective view of FIG. 7. Such delivery of lubricant to the bearing 91 is necessary, in order to properly lubricate the same, and in order to do so without placing the delivery line 67, in a position in which it may be severed by bearing-protecting silage cutting teeth 94 and 95.

With particular reference to FIGS. 4 and 7, it can be seen that the support arm 73 carries a wiping blade 96, at the lower most end thereof, that may be triangular construction or the like, in section, as illustrated in FIG. 4, by having its right-most edge, as illustrated in FIG. 4, in close running clearance with the outer edges of the cutting teeth 74, for facilitating the wiping of the teeth, and for preventing accumulated silage on the teeth, from being delivered to that zone between the auger 72 and the support arm 73. If such silage were allowed to accumulate between the auger 72 and the support arm 73, such could build up, and compact within such zone, acting upon the auger 72, as a brake, thereby slowing down the rotation of the auger 72 about its radial, or longitudinal axis. Accordingly, the wiping means 96 is highly desirable, and performs an important function in accordance with this invention. A similar wiping means 97 is also provided for the auxiliary auger, later to be discussed herein, with the wiping means 97 being in close running clearance with adjacent outermost teeth carried by the auxiliary auger, also later to be discussed herein.

It will be noted that the support arm 73 is generally triangular in transverse cross-section, as illustrated in FIG. 4, and is welded or otherwise suitably secured, as at 98, to a support member 100, generally of inverted U-shaped configuration, in transverse section illustrated in FIG. 5. The member 100 is bolted, by means of bolts 101 or the like, or otherwise suitably carried by an upstanding support member 102, with the member 102 having an angularly sloped surface 99, also facilitating the seating of the support arm 73 thereon, as illustrated in FIG. 4. The support 102 is welded to an upper portion of a band 103. The band 103 is generally circular in configuration, and constructed as a complete band, of the general size of the track 104 illustrated in FIG. 1, having a plurality of slots, or voids 105 therein with the voids 105 being equidistantly arcuately spaced about the band 103, in accordance with a desired predetermined stroke, later to be discussed herein. The band 103 is disposed against a track surface 106, of the circular track 104 illustrated in radial section, in FIG. 5. Movement of the band 105, will be noted, is of the band rotating within the opening or track 104, with the entire circular band 105 being moved simultaneously. The opening 104 is constructed by means of the channel illustrated, such channel 107 being disposed beneath the floor 108 of the silo, with the concrete floor 22 being cutaway, as illustrated in FIG. 5, to have an angular or chamfered portion 110, in order to accommodate the support member 102 as the member 102 is moved about the silo bottom, in response to movement of the band 103.

It will be noted that the surface of the track member 106, next adjacent the movable band 103 that slides thereagainst, must be lubricated, and such lubrication is provided by means of a duct or channel 111, cut into the band itself 103, as illustrated in FIG. 6, with the band being provided with lubricant being delivered through the member 102, by the duct 112 illustrated, with the duct 112 being supplied with grease, or other suitable lubricant by the line 66 illustrated in FIG. 2, passing through the support arm 73, as illustrated in FIG. 4, and downwardly along side of the members 100 and 102, as illustrated in FIG. 4.

A primary or first auxiliary auger 115 is connected to the portion 87 of the spindle 84, by means of a thru-bolt 116, as illustrated in FIG. 3. The auxiliary auger 115 may be constructed to be of any desired dimension, depending upon the diameter of the silo 20. Generally, the auxiliary auger 115, will have a tapered configuration, as illustrated in FIG. 3, and have two helically wound rows of cutting and conveying teeth 117, as illustrated in FIG. 7, with the two rows being disposed generally parallel to each other, for facilitating the conveying of silage in a right-to-left direction, as viewed in FIG. 3. The auger 115 is provided with the bearing-protecting teeth 94, and 95, which teeth 94 and 95 are adapted, upon rotation of the auger 115, about its radial axis to define a surface of revolution that is cup-like, or that is of the configuration of the frustum of a cone, and that encompasses the right-most end of the main auger 72, having the bearing 91 disposed thereon. This is for the purpose of protecting the bearing 91, to maintain the same free from compacting of silage thereabout, and for protecting the grease line 67. It is for this reason that the supporting bracket 81 has the S configuration illustrated in FIG. 7, in order to provide clearance for the rotating blades 94 and 95. It will be noted that the auxiliary auger 115 is also keyed to the spindle portion 87, by a suitable key and slot arrangement 120, of conventional type, in order that shear stresses and the like will be transmitted through the key arrangement 120, rather than through the bolt 116, with the bolt 116 fixing the position of the auxiliary auger 115, in an end-wise, or longitudinal direction. It will also be noted that the right-most end of the cylindrical portion 85 of the main auger 72 is provided with a sleeve 121 welded thereto at 122, for overhanging the bearing 91, as illustrated in FIG. 3, with the helical wound flange 95, in that position, for a portion of its length, being undercut as at 123, in order to accommodate the member 121. The enlarged cutters 124 are bolted to the flange members 124, as illustrated in FIGS. 3 and 7, by suitable bolts 125. It will be noted, that with teeth of the auxiliary auger, such as the teeth 94 and 95, being constructed as illustrated, in order to encompass the right-most portion of the main auger 72, the conveyance of the silage from the zone of cutting of the auxiliary auger 115, to the zone of conveyance of the main auger 72 by teeth 74 thereof, is facilitated.

It will also be noted, with reference to FIG. 3, that the supporting arm or bracket 81 is illustrated 90 degrees out of phase, in order to clearly illustrate the manner in which the member 81 conforms to the configuration of the blades 94 and 95.

A secondary auxiliary auger 126 is connected to the auger 115, by a thru-bolt 127, passing through connecting holes 128 at the right-most end of the auxiliary auger 115, with the auxiliary auger also having cutting teeth 130 carried thereby, and wound thereabout in a manner which will facilitate the conveying of silage cut thereby, from right to left, as illustrated in FIG. 3, with the peripheries of the cutting teeth 130, in conjunction with the cutting teeth 117, describing a generally frusto-conical surface of revolution. The purpose of the secondary auxiliary auger 126, is for cutting the silage most closely adjacent a silo wall 21. Depending upon the diameter of the silo 20, the number and length of auxiliary augers 115 and 126, may be appropriately selected.

Figure 11:
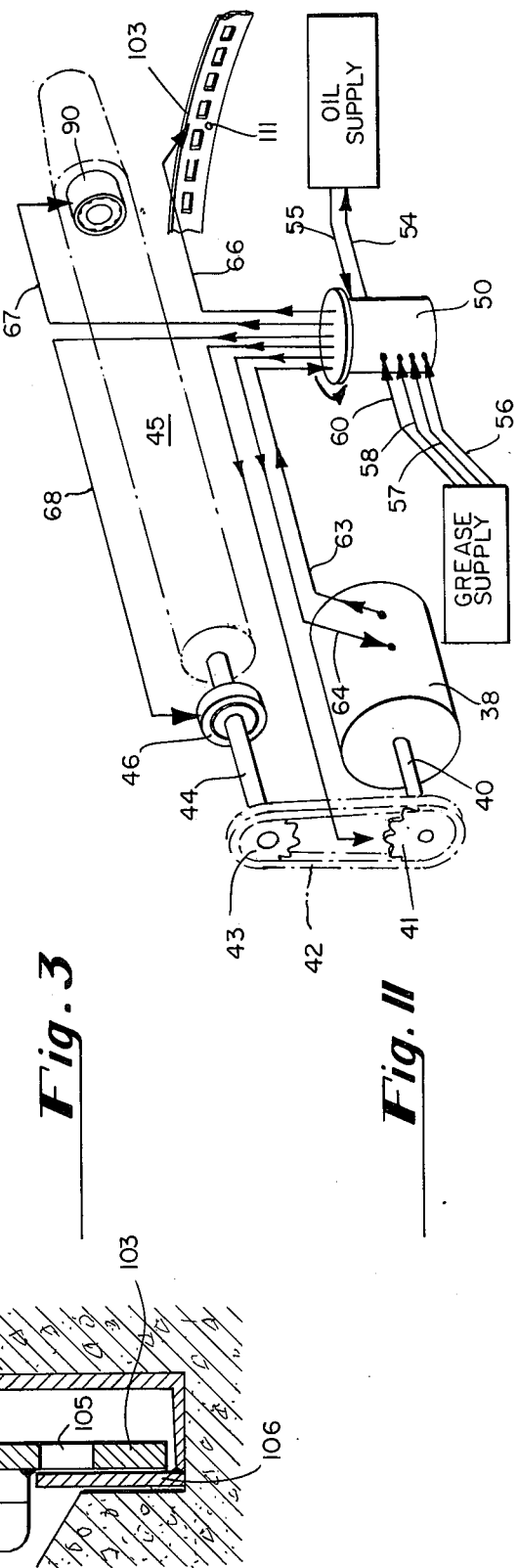
FIG. 11 is a schematic view of certain delivery systems for the fluid drive motor that provides the rotational drive for the auger of this invention, and for the lubrication systems of this invention, with several of the components being fragmentally or schematically illustrated, in perspective, for the sake of clarity.

With reference to FIG. 11, it will be apparent that oil and grease may be supplied to the member 50, from suitable supplies, as indicated, which would normally be located externally of the silo, but which could be located internally of the silo, beneath the floor thereof. However, for ease and facility in effecting the delivery of lubricating fluid such as grease, to the track for the band 103, to the bearing 91 to the bearing 46, and to the sprockets and chain 41, 43, and 42, a pressurized container of grease may be maintained outside the silo, for periodic actuation, or for automatic actuation, if desired, being delivered by suitable delivery lines, not shown, through an underground tunnel, or beneath the silo foundation, with such lines 56, 57, 58 and 60, then communicating with the container 50. Thus, the above-mentioned and other components of the apparatus and system of this invention that require lubrication, may be lubricated from externally of the silo, either automatically, or by merely actuating a grease supply system as aforesaid.

Figure 8:
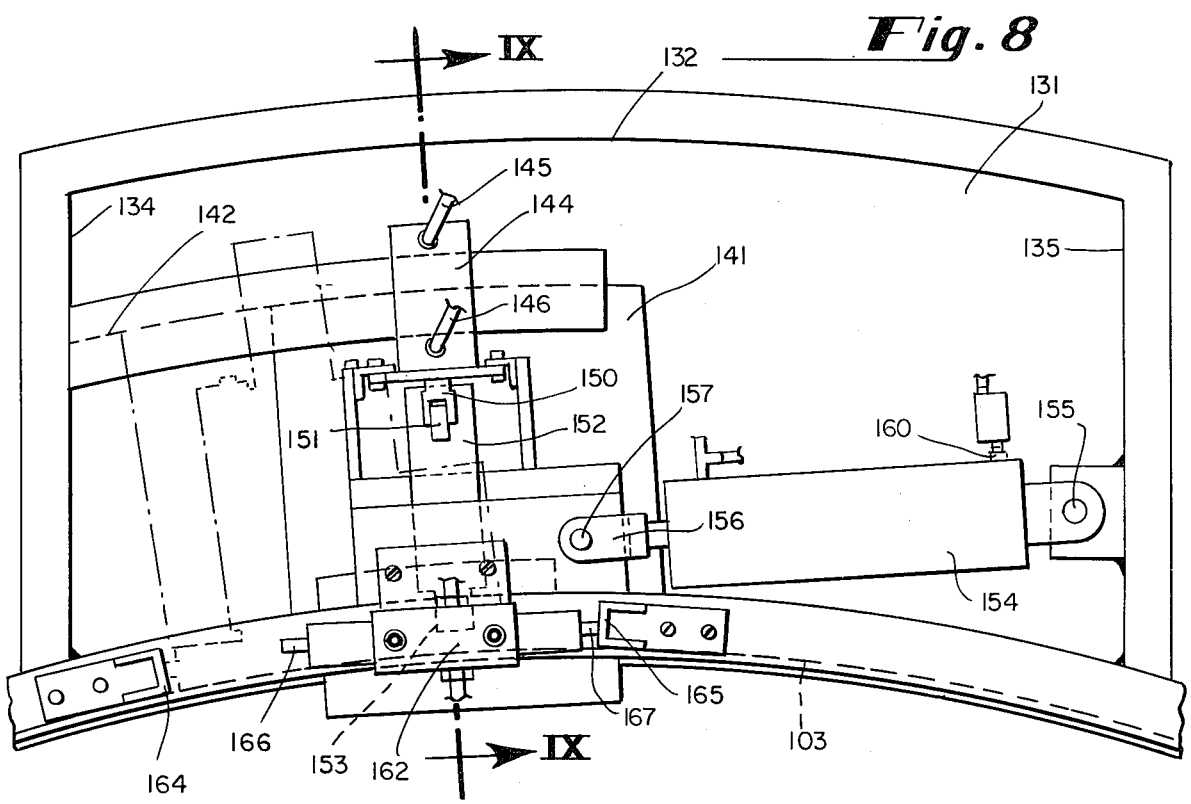
FIG. 8 is an enlarged bottom view of the drive apparatus illustrated in broken lines in FIG. 1, with two different positions of movable components of the apparatus being illustrated, one in full lines, and one in phantom.
Figure 9:
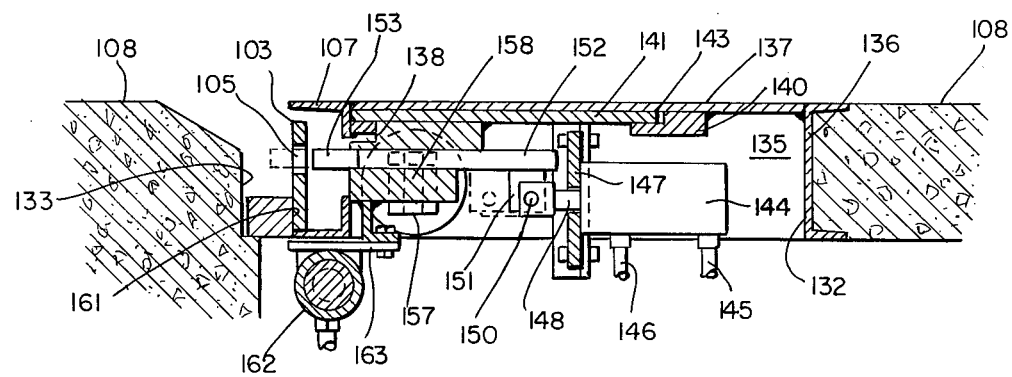
FIG. 9 is a vertical sectional view of some of the apparatus illustrated in FIG. 8, taken generally along the line IX—IX of FIG. 8.

With specific reference to FIG. 8, the unique apparatus of this invention for driving the annular drive band 103 is illustrated. A zone or pit 131 is provided, beneath the floor 108 of the silo 20, having outer and inner walls 132 and 133, and end wall 134 and 135. Such walls may be framed with steel channels such as that 136, if desired. A floor plate 137 is provided, extending between the upper flanges of the channels 107 and 136, as illustrated in FIG. 9. This plate 137 may be welded to the channels, as illustrated, and carries therebeneath a pair of guide members 138 and 140, generally welded thereto, that provide a slide for a movable plate member 141 therebetween. The plate 141 is adapted to slide through the arcuate paths defined by the guides 137 and 138, such paths being designated by the arcuate dotted line 142, for the outer edge 143 of the plate 141. It will be noted that the guides 138 and 140 also provide a supporting function, in that they have extensions that engage beneath the plate 141 for carrying the same, as illustrated most clearly in FIG. 9.

A first drive means 144, of the oil-operative hydraulic drive piston type is provided, with fluid drive and return lines 145 and 146 respectively connected thereto, and with the cylinder 144 being carried by a suitable mounting bracket 147, that in turn is carried by the plate 141, for movement therewith by any suitable, bolting, welding, or attachment devices. A cylinder rod 148 of the piston cylinder 144 is connected to a clevis 150 that in turn is pivotally connected to a lug 151 of a push-rod 152 having at its left-most end as illustrated in FIG. 9, a lug 153, that is adapted to engage within the slots or voids 155 of the band 103, upon introducing fluid through the line 145, to the piston cylinder 144, for driving the lug 153 leftwardly as viewed in FIG. 9. Thus, the lug 153 would assume the phantom line position as illustrated in FIG. 9, upon energizing the cylinder 144.

The plate 141 is driven by a second drive means, or piston cylinder 154, having its right-most end as viewed in FIG. 8 mounted to the wall 135, by a suitable pivotal mount 155, and with its left-most end connected to a suitable yoke or clevis 156, that in turn is pivotally connected at 157 to a plate 158, that in turn may be carried by suitable plates, brackets or the like secured to the movable plate 141. In any event, the piston cylinder or drive means 154 is adapted, upon energizing the cylinder 154, from the right inlet 160 thereof to drive the plate 141 leftward as viewed in FIG. 8, such that the band 103 and auger 72 would be driven in a clockwise direction, as viewed in FIG. 1. This, of course, is with the lug 153 in engagement with the voids or slots 105, of the band 103. The band 103, as viewed in FIG. 9 will thus move against a cut-down portion 161 of the track plate 106.

Also mounted to and carried for movement with the plate 141, is a spool valve 162, suitably carried by brackets 163, that are welded, bolted or otherwise secured to a support plate 158 or the like that is carried by the plate 141. The spool valve 162 is thus adapted for movement with the plate 141, throughout a stroke, the energization or driving of which is provided by the piston of the piston cylinder 154, and with the length of the stroke being determined by a pair of limit switch members or lugs 164 and 165, against which opposite ends 166 and 167 of the spool valve 162 engage. Thus, upon movement of the plate 141 from the full line position illustrated in FIG. 8, to the phantom line position thereof, the member 166 of the spool valve 162 will engage a stop or limit device 164, that in turn, will alter the delivery of driving fluid, in a way that will later be described herein, to reverse the fluid being applied to the first drive cylinder 144, for return of the lug 153 to the full line position illustrated in FIG. 9, from the driving phantom line position thereof, and then, in sequence, to reverse the direction of drive of the piston within the cylinder 154, to withdraw the plate 141 from the phantom line position illustrated in FIG. 8, to the full line position thereof. Following this, in the forward direction of drive, the cylinder 144 will again be actuated as aforesaid, followed, once again, by the actuation of the cylinder 154, such that, in sequence, the lug 153 will again become engaged within a void 105 of the band 103, and then the cylinder 154 will be actuated to once again drive the plate 141, to the phantom line position thereof illustrated in FIG. 8.

It will also be apparent that the spacing of the slots or voids 105 of the band 103 will be determined by the placement of the lug 164, for example, relative to the contact member 166 of the spool valve 162. Thus, the distance of drive of the plate 141, in a transverse direction (or arcuate to be more precise) is determined by the placement of the lug 164, which in turn is determined by the distance between centers of adjacent voids 105 of the band 103.

In some instances, it may be desirable to reversely drive the auger 72; i.e. in a counter-clockwise direction as viewed in FIG. 1, for example, should the auger 72 meet with excessive resistance, from silage or the like, or for any other reason. In this instance, the cylinder 144 will be actuated as aforesaid and then the piston cylinder 154 will be reversely actuated, to drive from left to right, as viewed in FIG. 8, followed by retraction of the lug 153 from a void, and by return of the piston within the cylinder 154 from right-to-left, then followed once again by energizing the cylinder 144 such that the lug 153 again comes into engagement with a void 105, followed once again, by actuation of the cylinder 154, for driving of the piston therein from left to right once again, as viewed in FIG. 8.

It is thus seen that a unique drive system is provided, disposed within the silo 20, mounted beneath the floor 22 thereof, completely out of contact with silage.

With particular reference to FIGS. 12, 13, 14 and 15, the hydraulic drive for the cylinders 144 and 154 of this invention is most clearly illustrated. It will be understood that this system has been particularly designed for use in driving the band 103 that in turn causes the auger and auger arm of this invention to sweep across a silo floor, but that this system may be utilized to drive other members, if desired, in other environments.

Figure 12:
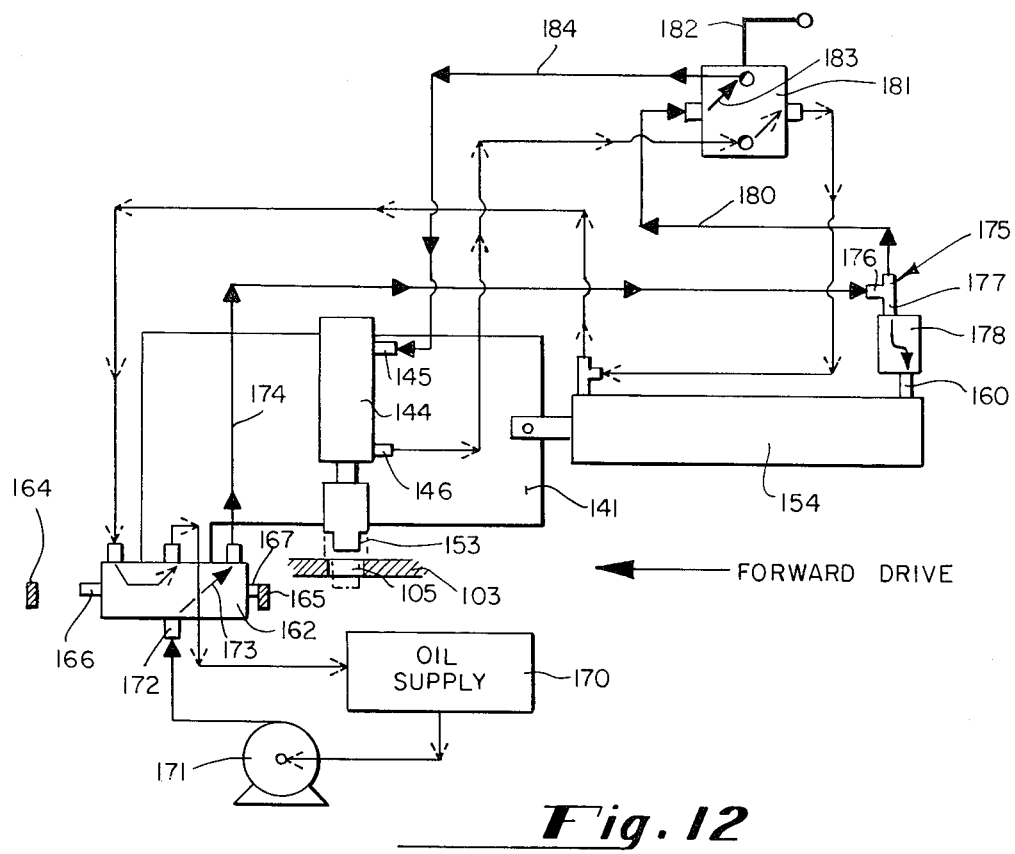
FIG. 12 is a schematic view of the band drive system and apparatus in accordance with this invention, illustrating the system of forward drive.
Figure 13:
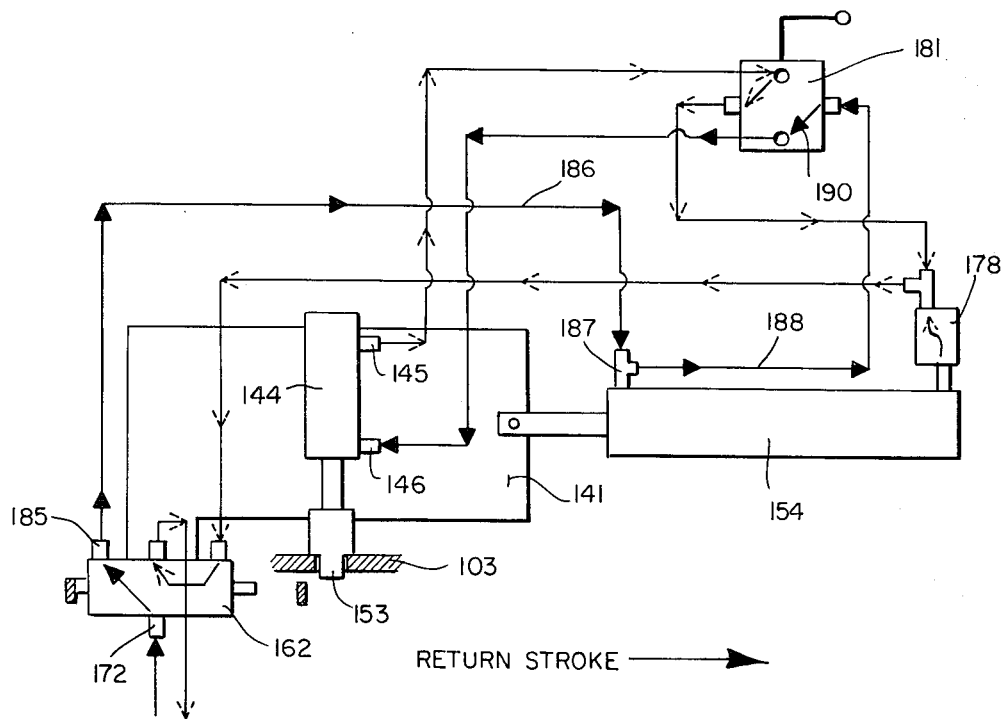
FIG. 13 is a view similar to that of FIG. 12, with the system illustrating the return stroke following a forward drive stroke.

With reference to FIG. 12, a fluid such as oil, is supplied from a supply tank 170, and is delivered to a compressor 171. This oil is then raised to a desired pressure, which, throughout the illustrations of FIGS. 12 through 15 will be designated by those lines having the solid arrows, with the return lines being those having the dotted arrowheads. Accordingly, with reference to FIG. 12, pressurized fluid passes from the compressor 171, to the inlet 172 of the spool valve 162, and, because the spool valve 162 is in a right-most position, wherein the movable right end of the probe 167 is in engagement with the lug 165, the oil will follow the path designated by the arrow 173, through the line 174, to enter the "Tee" 175 through the inlet 176 thereof. The Tee 175 has a lower line 177 connected to a valve 178, which will later be described hereinafter, but which requires a pre-determined pressure, for example, 200 pounds per square inch (p.s.i.) to operate it. Because the pressure in the line is not yet 200 p.s.i., the oil, seeking the least path of resistance will follow the line 180, through the manually actuable switch 181, which an operator has pre-set the manually actuable lever 182 thereof, to such a position that the oil will follow the path indicated by the arrow 183, as illustrated, to enter the inlet 145 of the piston cylinder 144, to drive the lug 153, from the full line position illustrated in FIG. 12, to the phantom line position thereof, in engagement within a void 105 of the band 103. Upon completing such movement, the pressure will back up through the line 184, 183, 180, until the pressure is sufficient to operate the valve 178, at which time only will the piston within the cylinder 154 be operated, by the entry of fluid through the inlet 160 thereof, such that the piston within the cylinder 154 will move leftward, as viewed in FIG. 12, guiding the plate 141 leftward, and carrying the band 103, also leftward, as viewed in FIG. 12. Because the spool valve 162 is also carried by the plate 141, the spool valve 162 will also be move leftward, until its left-most end probe 166 strikes the lug 164, at which time the spool valve will be actuated as illustrated in FIG. 13, such that pressurized fluid delivered to the inlet 172 thereof will pass outwardly through outlet 185, through line 186, to inlet 187 of the cylinder 154, and also through the line 188, back through the switch 181, through the path 190 thereof, to inlet 146 to the cylinder 144. However, it will be noted that, immediately upon actuation of the spool valve 162, the valve 178 closed, and being a two-way valve, upon entry of pressurized oil into the port 187 of the cylinder 154, and meeting resistence against opening the valve 178 in the opposite direction, the oil is first operative to operate the cylinder 144, for withdrawal of the lug 153 from the void 105 of the band 103, and then, as back pressure builds up, to a point at which the pre-load of the valve 178 is met in the reverse direction, the valve will open and permit the oil to drive the piston within the cylinder 154 rightward, as viewed in FIG. 13, such that the plate 141 may move rightward from the position illustrated in FIG. 13, within the lug 153 being in engagement with the band 103, such that the lug 153 may be moved to a position overlying a next adjacent void 105 of the band 103, whereupon the operation described above with respect to the illustration of FIG. 12 may again commence. Thus, once after another, the voids 105 of the band 103 may receive the lug 153, and with the cylinder 154 then being actuated to drive the plate 141, in a forward direction, which corresponds to a clockwise direction of rotation of the auger 72 as illustrated in FIG. 1, and with each increment of leftward movement of the band 103, the lug 153 is withdrawn, such that, upon return stroke of the piston of the cylinder 154, and upon return movement of the plate 141 and lug 153 carried thereby, the band 103 will not be returned therewith.

Figure 10:
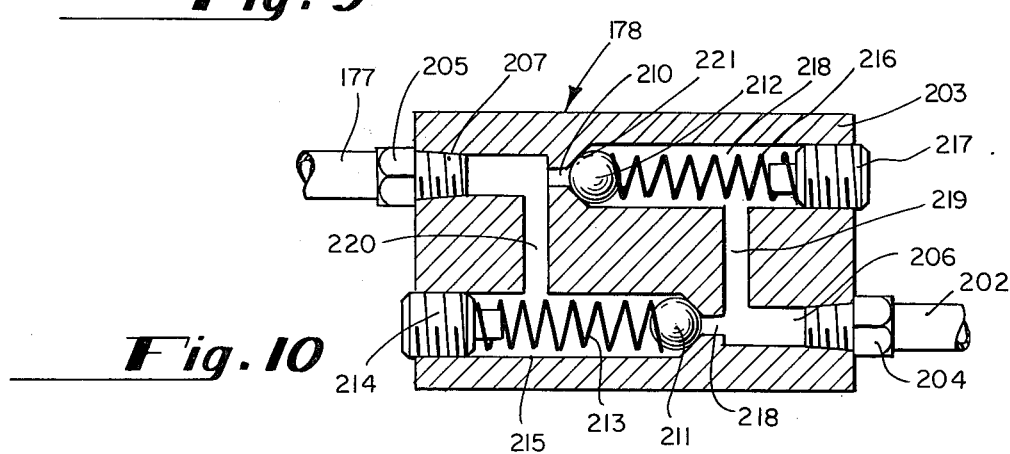
FIG. 10 is a sectional view, through a particularly novel two-way valve of this invention.
Figure 14:
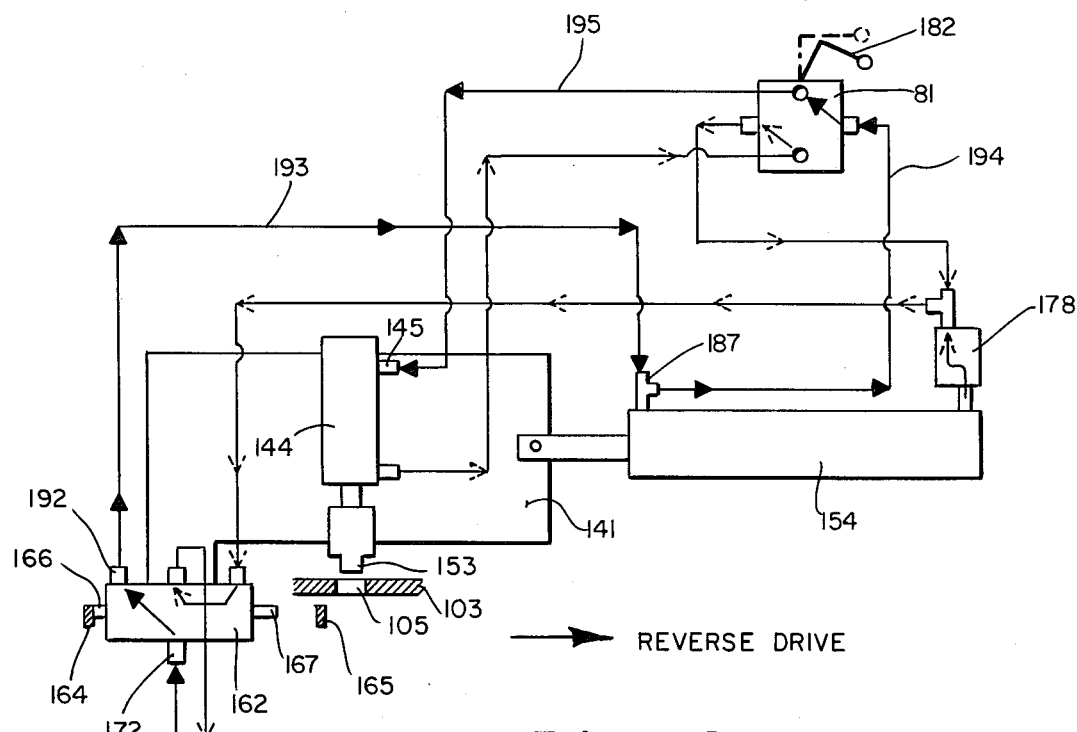
FIG. 14 is a view also similar to that of FIG. 12, with the system adapted for reverse drive.
Figure 15:
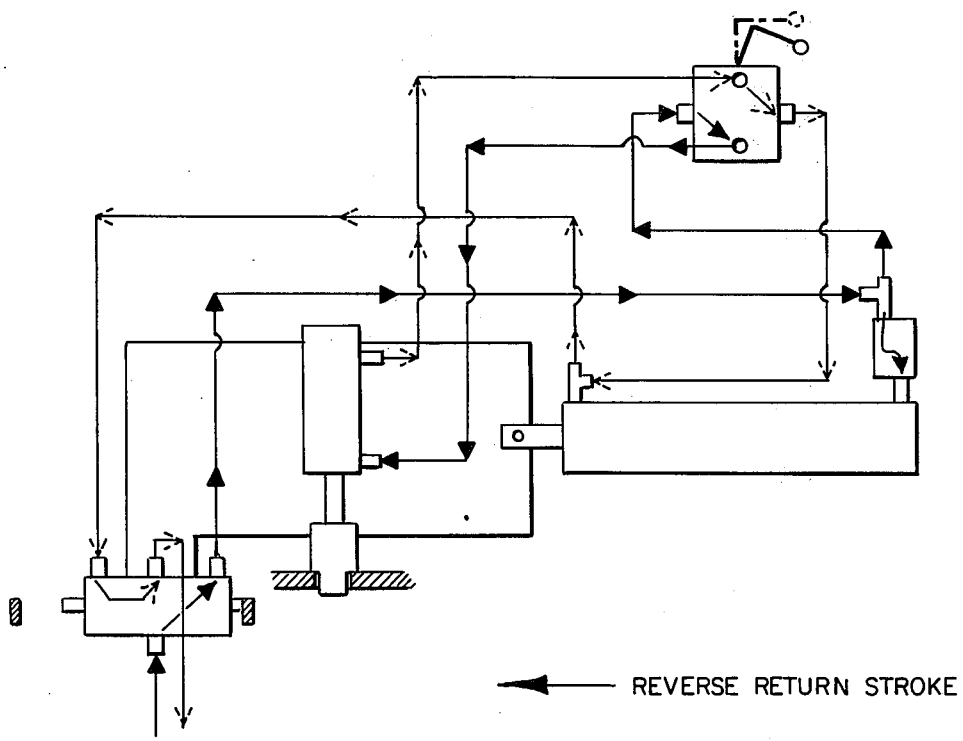
FIG. 15 is a view similar to that of FIG. 12, with the system adapted for effecting the return stroke of reverse drive.

Should it be desired to reverse the direction of rotation of the auger 72, to a counter-clockwise direction of rotation, as viewed in FIG. 1, the handle 182 may be moved from the phantom line position illustrated in FIG. 14, to the full line position thereof. Thus, oil entering the port 172 would pass through the spool valve 162 and out the port 192 thereof, through the line 193 and to the "Tee" 187 of the cylinder 154 at which point it would meet resistance determined by the preload of the valve 178, thereby allowing the pressurized oil to pass through the line 194, through the switch 181, to the line 195, to be delivered to the drive port 145 of the first drive cylinder 144, for causing the lug 153 to enter a void 105 of the belt or band 103. Once again, back pressure will build up, back through the line 195, 194 to the "Tee," 187, sufficient to overcome the preload of the valve 178, whereby the piston within the cylinder 154 will be driven rightward, as viewed in FIG. 14, thereby moving the plate 141 rightward, and carrying the band 103 in a rightward direction. Upon the spool tip 167, striking the lug 165, as illustrated in FIG. 15, incoming fluid to the port 172 of the spool valve 162 will be diverted to the port 196, through the line 197 to the "Tee" 175, once again, meeting resistance, and thereby delivering the pressurized fluid to the line 198, the switch 181, and to the line 200, into the port 146 of the cylinder 144, for lifting the lug 153 thereof from a void or slot 105 in the band 103, and with increased build-up of backup pressure within the line 200, and line 198, the valve 178 will be actuated to the piston within the cylinder 154, leftward, while the lug 152 is out of engagement relative to a void of the band 103. Thus, the complete operation of the hydraulic drive system of this invention is readily understood, such that by merely running hydraulic lines beneath the silo, to the outside thereof, an operator may by throwing a simple switch or lever 182, readily reverse the direction of sweep of the auger 72. The operation of the valve 178 will readily be understood with reference to FIG. 10, whereby an inlet 177, and and outlet 202 are provided, in a base block 203. Of course, the inlets and outlets may be reversed, depending upon whichever one of the ports 177 and 202 are connected to a line having the greatest pressure. Thread members 204 and 205, are in threaded connection within passageways 206 and 207, with the passageways 206 and 207 being in communication with associated respective passage portions 208 and 210, that in turn are in communication with movable ball valve members, respectively associated, 211 and 212. The ball valve 211 is provided with a preload spring 213, and with a threaded adjustment 214, whereby merely turning the member 214, and with its threads in deeper engagement with complemental threads of a bore 214 thereof, the spring 213 may be even more greatly compressed or released, depending upon the direction of turning of the member 214. The spring 216 is similarly operable, and is provided with a similar adjustment 217 for facilitating the preload setting. A duct 219 is provided, in communication between a passage 206 and the bore 218 in which the spring 216 is disposed. Similarly, a duct 220 is disposed in communication between the passage 210 and the bore 215.

Incoming fluid entering port 177, for example, will enter the duct 220, and will only serve to further or more tightly engage the ball valve member 211, within its valve seat. Accordingly, pressure must build up, until the pressure of fluid in the line 177 is sufficient to overcome the pressure exerted against the seat 221 by the ball 212, as applied by the force from the spring 216, in compression thereagainst. When sufficient pressure is on the ball 212, to overcome the force applied by the spring 216, the ball will move rightward, from the position illustrated in FIG. 10, for passage of fluid through the bore 218, the duct 217, and outwardly through the port 202. The operation is identical in reverse, and such need not be described in detail. It will thus be seen that a novel two-way valve is presented that is highly desirable for use with the system illustrated in FIGS. 12 through 15 herein, as well as for use with other systems.

It will be apparent that the various details of construction, as well as the use and operation of the components and systems set forth herein may vary, in accordance with particular applications of such features. Also, details may be made in parts and arrangements of parts, without departing from the spirit and scope of the invention, as recited in the appended claims. Furthermore, such modifications as are within the skill of those in the art may also be made all within the spirit and scope of the claimed invention.

What is claimed is:

1. Apparatus for use in unloading a silo from the bottom thereof through a generally central opening therein, comprising: an auger, generally radially disposed at the bottom of a silo above a floor thereof, said auger having cutting means thereon for cutting silage and conveying silage radially inwardly toward the opening; means mounting said auger at the central opening for pivotal movement thereabout; means for drivingly rotating said auger about its generally radial axis; a generally; circular band disposed at the bottom of the silo in generally concentric disposition with the center of the silo, said band being a continuous strip having a plurality of equidistantly arcuately spaced voids therein; a track for said band, said band being movably disposed in relation to said track; means connecting said auger and said band for movement of said auger and said band together; means disposed inside the silo for driving said band from inside the silo and moving said auger in an arcuately sweeping motion relative to the silo floor, said means for driving said band comprising means for serially engaging said voids and discontinuously moving said band through a predetermined stroke, for rotative indexing of said band, wherein said means for serially engaging and moving comprises a lug drive means for moving a lug between positions into and out of engagement with said voids; drive means for said lug for moving said lug through said predetermined stroke when said lug is in engagement with said void, said drive means for moving said lug comprising first and second piston cylinders, with said first cylinder being mounted on a plate for movement therewith, with said plate being slidably mounted beneath said silo floor, with said second cylinder being fixedly connected beneath said silo floor at one end and being connected to said plate at its other end for driving said plate; valve means carried for movement with said plate, with limit switch means disposed at opposite ends of the stroke of movement of said valve means with said plate for engagement with fixedly disposed stops at the said opposite ends of the said stroke, for actuation of the said valve means for controlling the positions of said lug relative to said voids.

2. Apparatus for incrementally moving a movable member through a substantially longitudinal stroke, comprising a movable member having engagement means thereon to facilitate engagement by a lug, a carrying member, a lug carried by said carrying member, first drive means for said lug carried by said carrying member, second drive means for driving said carrying means through a substantially longitudinal stroke, said first and second drive means being fluid operative, including a single fluid supply means for supply driving fluid to both of said first and second drive means for sequentially first actuating said first drive means for engagement of said lug with said engagement means in response to fluid pressure within the system reaching a first predetermined value, and then actuating said second drive means for substantially longitudinal movement of said carrying member in response to fluid pressure within the system reaching a second predetermined value.

3. The apparatus of claim 2, including limit switch means carried by said carrying means for movement therewith, for engagement with switching elements for controlling the length of stroke of substantially longitudinal movement.

4. The apparatus of claim 3, including manually actuable reversing means for reversing the direction of drive of said second drive means, for substantially longitudinal movement of said movable member in a reverse direction, through the movement of said lug and carrying member.

5. The apparatus of claim 4, wherein said carrying member comprises a generally circular band in connection with a radial outer portion of a radially disposed bottom unloading silo auger and comprises means for sweeping said auger across a silo floor in a generally circular sweep of intermittent stroke.

6. Apparatus for use in unloading a silo from the bottom thereof through a generally central opening therein, comprising an auger, generally radially disposed at the bottom of a silo above a floor thereof, the auger having cutting means thereon for cutting silage and coveying silage radially inwardly toward the opening means mounting the auger at the central opening for pivotal movement thereabout, means for drivingly rotating the auger about its generally radial axis, a generally circular band disposed at the bottom of the silo in generally concentric disposition with the center of the silo, said band being movably disposed in relation to a track therefor, a track for said band, means connecting said auger and said band for movement of said auger and said band together, and means disposed inside the silo for driving said band from inside the silo and moving said auger in an arcuately sweeping motion relative to the silo floor, wherein said band is a continuous strip having a plurality of equidistantly arcuately spaced voids therein, and wherein said means for driving said band comprises means for serially engaging said voids and discontinuously moving said band through a predetermined stroke, for rotative indexing of said band, wherein said means for serially engaging and moving comprises a lug drive means for moving said lug between positions into and out of engagement with said voids, and drive means for said lug for moving said lug through said predetermined stroke when said lug is in engagement with a said void, wherein said drive means for moving said lug comprises first and second piston cylinders, with said first cylinder being mounted on a plate for movement therewith, with said plate being slidably mounted beneath said silo floor, and with said second cylinder being fixedly connected beneath said silo floor at its one said end and being connected to said plate at its other said end for driving said plate.

7. The apparatus of claim 6, wherein an auger support arm is provided, disposed generally parallel to said auger, with said support arm being mounted at the central opening for pivotal movement thereabout with said auger, wherein said means connecting said auger and said band comprises means connecting said support arm and said band, said support arm, and means connecting said auger to said support arm at a radial outer portion of said auger relative to the silo central opening, whereby said support arm is also driven in a sweeping motion about the silo floor and facilitates the driving of said auger in its sweeping motion.

8. The apparatus of claim 6, wherein said second cylinder is a double-acting cylinder for reversing the direction of drive provided thereby.

9. The apparatus of cliam 8, including means for operating said cylinders in a predetermined sequence from a single pressurized fluid source.

10. The apparatus of claim 6, including means for operating said cylinders in a predetermined sequence from a single pressurized fluid source.

11. Apparatus for use in unloading a silo from the bottom thereof through a generally central opening therein, comprising an auger, generally radially disposed at the bottom of a silo above a floor thereof, the auger having cutting means thereon for cutting silage and conveying silage radially inwardly toward the opening, means mounting the auger at the central opening for pivotal movement thereabout, means or drivingly rotating the auger about its generally radial axis, a generally circular band disposed at the bottom of the silo in generally concentric disposition with the center of the silo, said band being movably disposed in relation to a track therefor, a track for said band, means connecting said auger and said band for movement of said auger and said band together, and means disposed inside the silo for driving said band from inside the silo and moving said auger in an arcuately sweeping motion relative to the silo floor, wherein an auger support arm is provided, disposed generally parallel to said auger, with said support arm being mounted at the central opening for pivotal movement thereabout with said auger, wherein said means connecting said auger and said band comprises means connecting said support arm and said band, said support arm, and means connecting said auger to said support arm at a radial outer portion of said auger relative to the silo central opening, whereby said support arm is also driven in a sweeping motion about the silo floor and facilitates the driving of said auger in its sweeping motion, wherein said means connecting said auger to said support arm comprises a supporting bracket having a bearing carried at the auger end of the bracket, with said auger being mounted through said bearing for rotation relative to said bracket, including means for delivering lubricant to said bearing, through said arm from outside the silo.

12. Apparatus for use in unloading a silo from the bottom thereof through a generally central opening therein, comprising an auger, generally radially disposed at the bottom of a silo above a floor thereof, the auger having cutting means thereon for cutting silage and conveying silage radially inwardly toward the opening, means mounting the auger at the central opening for pivotal movement thereabout, means for drivingly rotating the auger about its generally radial axis, a generally circular band disposed at the bottom of the silo in generally concentric disposition with the center of the silo, said band being movably disposed in relation to a track therefor, a track for said band, means connecting said auger and and said band for movement of said auger and said band together, and means disposed inside the silo for driving said band from inside the silo and moving said auger in an arcuately sweeping motion relative to the silo floor, wherein said band is slidably disposed within a generally circular track in the floor of the silo, wherein said band is a continuous strip having a plurality of equidistantly arcuately spaced voids therein, and wherein said means for driving said band comprises means for serially engaging said voids and discontinuously moving said band through a predetermined stroke, for rotative indexing of said band, including means for selectively reversing the direction of movement of said band.

13. Apparatus for use in unloading a silo from the bottom thereof through a generally central opening therein, comprising an auger, generally radially disposed at the bottom of a silo above a floor thereof, the auger having cutting means thereon for cutting silage and conveying silage radially inwardly toward the opening, means mounting the auger at the central opening for pivotal movement thereabout, means for drivingly rotating the auger about its generally radial axis, a generally circular band disposed at the bottom of the silo in generally concentric disposition with the center of the silo, said band being movably disposed in relation to a track therefor, a track for said band, means connecting said auger and said band for movement of said auger and said band together, and means disposed inside the silo for driving said band from inside the silo and moving said auger in an arcuately sweeping motion relative to the silo floor, wherein an auger support arm is provided, disposed generally parallel to said auger, with said support arm being mounted at the central opening for pivotal movement thereabout with said auger, wherein said means connecting said auger and said band comprises means connecting said support arm and said band, said suppot arm, and means connecting said auger to said support arm at a radial outer portion of said auger relative to the silo central opening, whereby said support arm is also driven in a sweeping motion about the silo floor and facilitates the driving of said auger in its sweeping motion, wherein said band is slidably disposed within a generally circular track in the floor of the silo, including means for delivering lubricant to said track from outside the silo, through said support arm.

14. Apparatus for use in unloading a silo from the bottom thereof through a generally central opening therein, comprising an auger, generally radially disposed at the bottom of a silo above a floor thereof, the auger having cutting means thereon for cutting silage and conveying silage radially inwardly toward the opening, means mounting the auger at the central opening for pivotal movement thereabout, means for drivingly rotating the auger about its generally radial axis, a generally circular band disposed at the bottom of the silo in generally concentric disposition with the center of the silo, said band being movably disposed in relation to a track therefor, a track for said band, means connecting said auger and said band for movement of said auger and said band together, and means disposed inside the silo for driving said band from inside the silo and moving said auger in an arcuately sweeping motion relative to the silo floor, wherein an auger support arm is provided, disposed generally parallel to said auger, with said support arm being mounted at the central opening for pivotal movement thereabout with said auger, wherein said means connecting said auger and said band comprises means connecting said support arm and said band, said support arm, and means connecting said auger to said support arm at a radial outer portion of said auger relative to the silo central opening, whereby said support arm is also driven in a sweeping motion about the silo floor and facilitates the driving of said auger in its sweeping motion, wherein said band is slidably disposed within a generally circular track in the floor of the silo, including means for delivering lubricant to said track through said band.

15. Apparatus for use in unloading a silo from the bottom thereof through a generally central opening therein, comprising an auger, means mounting the auger for generally radial disposition, means for rotatably driving the auger about its own generally radial axis, and means for driving the auger in a sweeping motion about a pivot point located generally radially inwardly of the auger, and means for lubricating both said driving means from beyond the radial outermost end of the auger, outside the silo with which the apparatus may be associated.

16. The apparatus of claim 15, including means for supporting a radial outer portion of the auger, and wherein said lubricating means also comprises means for lubricating said supporting means from beyond the outermost end of the auger, outside the silo with which the apparatus may be associated.

17. Apparatus for use in unloading a silo from the bottom thereof through a generally central opening therein, comprising an auger for generally radial disposition at the bottom of a silo above a floor thereof, an auger support arm disposed generally parallel to said auger, means connecting said auger to said support arm at a radial outer position of said auger relative to the silo central opening, the auger having cutting means thereon for cutting silage and conveying silage radially inwardly toward the opening, means for mounting the auger and support arm at the central opening for pivotal movement thereabout, means for driving the auger about its generally radial axis, wherein said means connecting said auger to said support arm includes a bearing member disposed in carrying relation to the radial outer end of said auger, wherein said auger comprises a primary auger, including an auxiliary auger, mounted in coaxial disposition at the radial outermost end of said primary auger for rotation therewith, cutting means carried by the auxiliary auger for cutting silage and conveying silage in a radial inward direction toward the cutting and conveying means of said primary auger, with portions of said cutting means of said auxiliary auger adjacent to said primary auger being sized and configured to describe during rotation, a surface of revolution that at least partially cups said bearing member for maintaining the zone about said bearing member substantially free of silage.

18. Apparatus for use in unloading a silo from the bottom thereof through a generally central opening therein, comprising an auger for generally radial disposition at the bottom of a silo above a floor thereof, an auger support arm disposed generally parallel to said auger, means connecting said auger to said support arm at a radial outer position of said auger relative to the silo central opening, the auger having cutting means thereon for cutting silage and conveying silage radially inwardly toward the opening, means for mounting the auger and support arm at the central opening for pivotal movement thereabout, means for driving the auger about its generally radial axis, wherein said auger comprising a primary auger, including an auxiliary auger mounted in coaxial disposition at the radial outermost end of said primary auger for rotation therewith, cutting means carried by the auxiliary auger for cutting silage and conveying silage in a radial inward direction toward the cutting and conveying means of said primary auger, with portions of said cutting means of said auxiliary auger adjacent to said primary auger being sized and configured to describe during rotation, a surface of revolution that at least partially cups a portion of said primary auger, for facilitating the conveyance of silage from said auxiliary auger to said primary auger.

19. The apparatus of claim 18, wherein said cutting means on the radial innermost portion of said primary auger are disposed in a silage-conveying direction opposite the cutting means on the remainder of said primary auger for delivering silage to a silo floor opening disposed a short radial outward distance from precise geometric center of a silo.

20. The apparatus of claim 18, including a secondary auxiliary auger mounted in coaxial disposition at the radial outermost end of said auxiliary auger, also with cutting means thereon.

21. The apparatus of claim 20, wherein the cutting means on said auxiliary auger and said secondary auxiliary auger together define a generally conical surface of revolution.

* * * * *

UNITED STATES PATENT OFFICE
CERTIFICATE OF CORRECTION

Patent No. 4,057,151               Dated November 8, 1977

Inventor(s) Richard L. Weaver

It is certified that error appears in the above-identified patent and that said Letters Patent are hereby corrected as shown below:

Column 9, line 49, "within" should be --without--.

Column 10, line 26, after "will be actuated to", insert --guide--.

Signed and Sealed this

Second Day of May 1978

[SEAL]

Attest:

RUTH C. MASON
Attesting Officer

LUTRELLE F. PARKER
Acting Commissioner of Patents and Trademarks